(12) United States Patent
Argaud et al.

(10) Patent No.: US 7,942,630 B2
(45) Date of Patent: May 17, 2011

(54) SYSTEM FOR VENTILATING A DOWNSTREAM CAVITY OF AN IMPELLOR OF A CENTRIFUGAL COMPRESSOR

(75) Inventors: Thierry Argaud, Chartrettes (FR); Antoine Robert Alain Brunet, Moissy Cramayel (FR); Jean-Christophe Leininger, Paris (FR)

(73) Assignee: Snecma, Paris (FR)

( * ) Notice: Subject to any disclaimer, the term of this patent is extended or adjusted under 35 U.S.C. 154(b) by 972 days.

(21) Appl. No.: 11/779,016

(22) Filed: Jul. 17, 2007

(65) Prior Publication Data
US 2010/0028137 A1 Feb. 4, 2010

(30) Foreign Application Priority Data

Jul. 19, 2006 (FR) ...................................... 06 06541

(51) Int. Cl.
*F01D 5/08* (2006.01)
(52) U.S. Cl. ...................... 415/144; 415/168.1; 415/176
(58) Field of Classification Search .................. 415/144, 415/168.1, 168.2
See application file for complete search history.

(56) References Cited

U.S. PATENT DOCUMENTS

| 3,239,193 | A | * | 3/1966 | Kerensky | ...................... 415/110 |
| 4,462,204 | A | | 7/1984 | Hull | |
| 6,276,896 | B1 | | 8/2001 | Burge et al. | |
| 7,010,916 | B2 | * | 3/2006 | Sumser et al. | .................. 60/602 |
| 2001/0047651 | A1 | | 12/2001 | Fukutani | |

FOREIGN PATENT DOCUMENTS

| DE | 42 25 625 A1 | 2/1994 |
| EP | 0 961 033 A1 | 12/1999 |

OTHER PUBLICATIONS

U.S. Appl. No. 11/778,928, filed Jul. 17, 2007, Argaud, et al.
U.S. Appl. No. 11/779,000, filed Jul. 17, 2007, Argaud, et al.
U.S. Appl. No. 11/780,287, filed Jul. 19, 2007, Brunet, et al.
U.S. Appl. No. 11/780,225, filed Jul. 19, 2007, Brunet, et al.

* cited by examiner

*Primary Examiner* — Richard Edgar
(74) *Attorney, Agent, or Firm* — Oblon, Spivak, McClelland, Maier & Neustadt, L.L.P.

(57) ABSTRACT

A system for ventilating a downstream cavity of an impellor of a centrifugal compressor in a turbomachine, this system including flow diversion system mounted fixedly in the downstream cavity of the impellor in order to divert the ventilation air taken from the outlet of the compressor and cause it to circulate radially from the inside to the outside along the downstream face of the impellor.

11 Claims, 5 Drawing Sheets

SYSTEM FOR VENTILATING A DOWNSTREAM CAVITY OF AN IMPELLOR OF A CENTRIFUGAL COMPRESSOR

The present invention relates to a system for ventilating a downstream cavity of an impellor of a centrifugal compressor in a turbomachine such as in particular an aircraft turbojet or turboprop or a gas generator.

BACKGROUND OF THE INVENTION

The annular cavity that is formed downstream of the rotor or impellor of a centrifugal compressor in a turbomachine must be ventilated to take away the heat energy generated by the impellor. This ventilation is usually provided by taking air from the output of the compressor, at the junction with the inlet of an annular diffuser that supplies a combustion chamber.

This ventilation air that already has a relatively high temperature, heats up through viscous friction on the downstream face of the impellor while running from the outside to the inside in the downstream cavity of the impellor, the air becoming hotter as it comes closer to the axis of rotation of the impellor. This hot air may, by convection, raise the temperature of the impellor, and in particular its radially internal portion where the mechanical stresses are the highest in operation, which causes a risk of damage to the impellor by material creep.

DESCRIPTION OF THE PRIOR ART

It has been proposed to mount on the downstream face of the impellor an annular heat protection shield. However, the attachment of this shield to the impellor is complex and causes an increase in the weight and inertia in rotation of the compressor impellor, which can reduce the performance of the turbomachine.

SUMMARY OF THE INVENTION

The object of the invention is in particular to provide a simple, effective and economic solution to these problems.

Accordingly it proposes a system for ventilating a downstream cavity of an impellor of a centrifugal compressor in a turbomachine, this cavity being delimited by a downstream face of the impellor and by an annular downstream end-piece of an annular diffuser arranged at the output of the compressor and being ventilated by taking air from the outlet of the centrifugal compressor, which comprises diversion means mounted fixedly in the downstream cavity of the impellor in order, on the one hand, to divert, along the annular end-piece of the diffuser, the air taken from the outlet of the compressor to its inlet in the downstream cavity of the impellor, and in order, on the other hand, to divert the ventilation air from the downstream portion of the downstream cavity and cause it to flow radially from the inside to the outside along the downstream face of the impellor.

The invention makes it possible to cause ventilation air to flow along the face of the impellor radially from the inside to the outside, that is to say in a centrifugal direction relative to the axis of rotation of the impellor and not centripetal as in the prior art. This ventilation air is relatively cool at the radially internal portion of the impellor and heats up while flowing from the inside to the outside along the downstream face of the impellor. The hotter air flows at the radially external portion of the impellor that is less mechanically stressed and less sensitive to this hot air, which makes it possible to increase the service life of the impellor.

In another feature of the invention, the diversion means comprise an annular metal sheet mounted fixedly in the downstream cavity of the impellor on means of attaching the downstream end of the annular end-piece of the diffuser, this metal sheet extending upstream from these attachment means along the downstream face of the impellor and terminating in the vicinity of the means for taking air from the outlet of the compressor. This annular metal sheet forms, with the downstream face of the impellor, a first annular passageway for ventilation air.

In a first embodiment of the invention, the diversion means include a second annular metal sheet mounted fixedly on means for attaching the downstream end of the annular end-piece of the diffuser, this second metal sheet extending upstream from these attachment means substantially parallel to the annular end-piece of the diffuser and terminating in the vicinity of the means for taking air from the outlet of the compressor. This second annular metal sheet delimits, with the end-piece of the diffuser, a second annular passageway for ventilation air that communicates with the annular passageway formed by the first annular metal sheet.

The upstream end of the second annular metal sheet is situated radially outside the upstream end of the first annular metal sheet. Advantageously, the downstream face of the impellor supports an annular flow diversion element that extends as a protrusion into the downstream cavity between the upstream ends of the two annular metal sheets.

The second annular metal sheet may be mounted fixedly inside the downstream cavity of the impellor in order to form, with the annular end-piece of the diffuser, an annular passageway that is supplied with air taken from the outlet of the compressor.

As a variant, the second annular metal sheet is mounted fixedly on the outside of the downstream cavity of the impellor in order to form, with the annular end-piece of the diffuser, an annular passageway that is supplied with air coming out of the diffuser.

In another variant embodiment of the invention, the first annular metal sheet defines, with the downstream face of the impellor, an annular passageway supplied at its downstream end with air taken from a ventilation air injection circuit.

The system may comprise means for injecting ventilation air onto the downstream face of the impellor, the flow of air coming out of these injection means being oriented in the direction of rotation of the impellor, the injection means being supported by the second annular metal sheet and/or by the annular end-piece of the diffuser.

The invention also relates to a turbomachine such as an aircraft turbojet or a turboprop, which comprises a ventilation system as described above.

BRIEF DESCRIPTION OF THE DRAWINGS

The invention will be better understood and other details, features and advantages of the present invention will appear on reading the following description made as a nonlimiting example and with reference to the appended drawings, in which.

DESCRIPTION OF THE PREFERRED EMBODIMENTS

Figure 1:
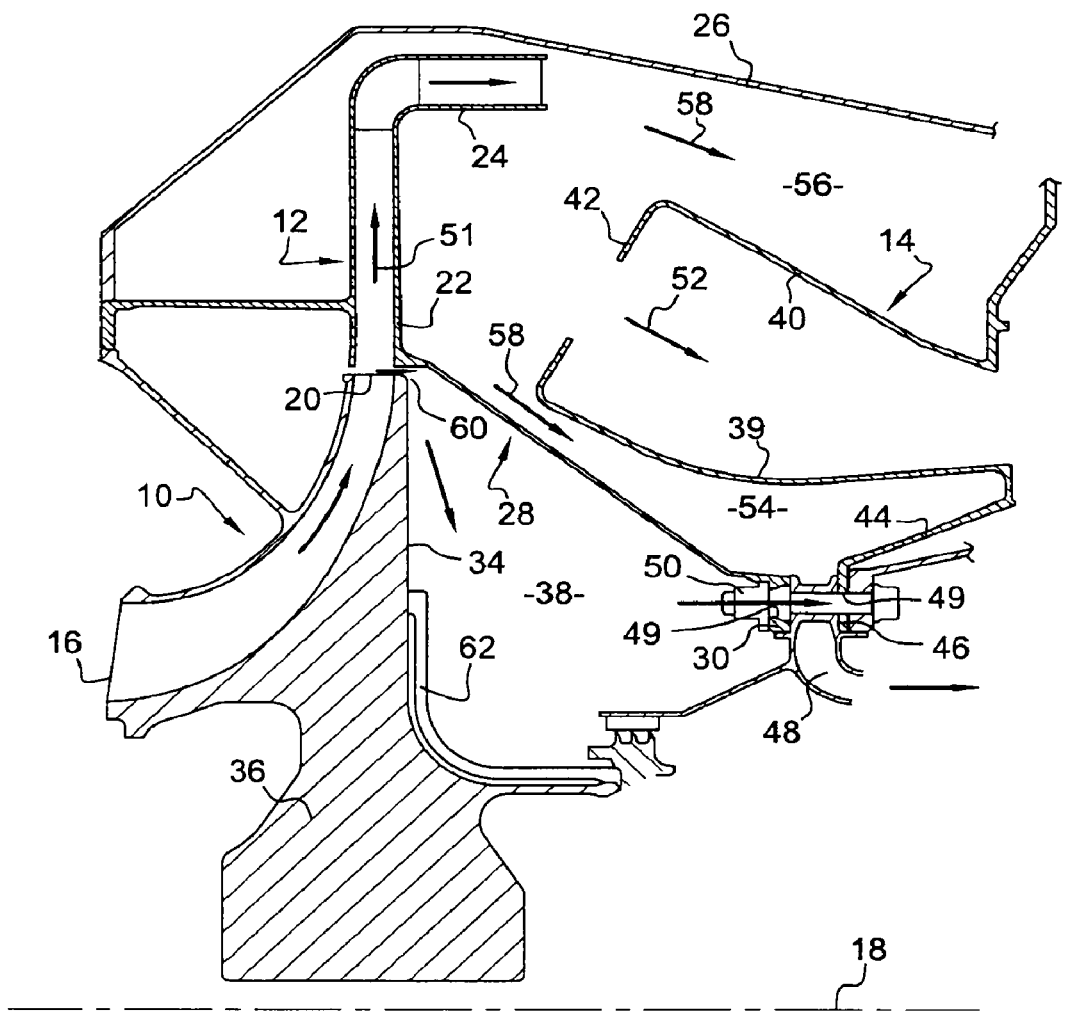
FIG. 1 is a schematic half-view in axial section of a system for ventilating a downstream cavity of a compressor impellor according to the prior art.

Reference is made first of all to FIG. 1 which represents a portion of a turbomachine, such as an aircraft turbojet or turboprop, comprising, from upstream to downstream, in the direction of flow of the gases inside the turbomachine, a compressor centrifugal stage 10, an annular diffuser 12 and a combustion chamber 14.

The inlet 16 of the centrifugal stage 10 is oriented upstream, substantially parallel to the axis 18 of the turbomachine, and its outlet 20 is oriented outward, substantially perpendicularly to the axis 18, and is aligned with a radial inlet 22 of the diffuser 12. This diffuser is of annular shape bent substantially at 900 and comprises an annular outlet 24 that is oriented parallel to the axis of the turbomachine and that emerges into an annular enclosure in which the combustion chamber 14 is mounted.

The diffuser 12 is supported by an external casing 26 of the turbomachine that externally surrounds the compressor 10, the diffuser 12 and the combustion chamber 14.

The diffuser 12 comprises a substantially frustoconical downstream annular end-piece 28 that extends downstream and inward from the inlet 22 of the diffuser, and terminates at its downstream end with an annular flange 30 for attachment to a ventilation air injection circuit 32, particularly of a turbine (not shown) situated downstream of the combustion chamber 14.

The end-piece 28 of the diffuser delimits, with a downstream face 34 of the rotor or impellor 36 of the centrifugal stage 10, an annular cavity 38 that communicates at its radially external end with the outlet 20 of the compressor. The downstream face 34 of the impellor comprises a radial annular surface that is oriented downstream and connected at its radially internal end to a downstream cylindrical surface oriented outward.

The combustion chamber 14 comprises two coaxial walls of revolution 39, 40 extending one inside the other and connected at their upstream ends to a chamber bottom wall 42. The radially external wall 40 of the chamber is attached at its downstream end to the external casing 26, and its radially internal wall 39 is connected at its downstream end to a frustoconical ring 44 that comprises, at its radially internal end, an internal annular flange 46 for attachment to the aforementioned circuit 32.

This circuit 32 defines an annular channel 48 with a substantially L-shaped section that opens outward at its radially upstream end, downstream of the flange 30 of the end-piece 28 of the diffuser and upstream of the flange 46 of the ring 44, and, at its axially downstream end opens downstream. Orifices 49 are formed on the flanges 30 and 46 of the end-piece 28 and of the ring 44, respectively, for the passage of attachment means 50 of the screw-nut type that extend through the corresponding orifices of the circuit 32.

The majority of the airflow coming out of the compressor 10 passes into the diffuser 12 (arrow 51) and supplies the combustion chamber 14 (arrow 52) and internal annular stream 54 and external annular stream 56 traveling round the combustion chamber 14 (arrows 58). The external stream 56 is formed between the external casing 26 and the external wall 40 of the chamber, and the internal stream 54 is formed between the end-piece 28 of the diffuser and the internal wall 39 of the chamber. The air that passes into the internal stream 54 supplies, amongst other things, the air injection circuit 32.

A small portion of the airflow coming out of the centrifugal compressor 10 enters the downstream cavity 38 of the impellor (arrow 60) in order to ventilate it. The air 60 flows centripetally relative to the axis of rotation of the impellor, that is to say from the outside to the inside, along the downstream face 34 of the impellor and heats up by viscous friction on this face, the air becoming hotter as it comes closer to the axis 18 of rotation of the impellor.

In the prior art, the radially internal portion of the impellor 36 that is greatly mechanically stressed, is protected from this hot air by an annular shield 62 that is mounted downstream of the impellor and covers the radially internal portion of the downstream face 34 of the impellor. However, this shield has many disadvantages previously cited.

The ventilation system according to the invention makes it possible to dispense with this shield 62 thanks to flow diversion means mounted fixedly in the cavity 38 particularly in order to cause the ventilation air to flow along the downstream face of the impellor in a centrifugal manner relative to the axis of the impellor, that is to say radially from the inside to the outside. Therefore, the relatively cool ventilation air flows on the radially internal portion of the impellor and hotter air, which is heated by viscous friction on the downstream face of the impellor, flows on the radially external portion of the impellor.

Figure 2:
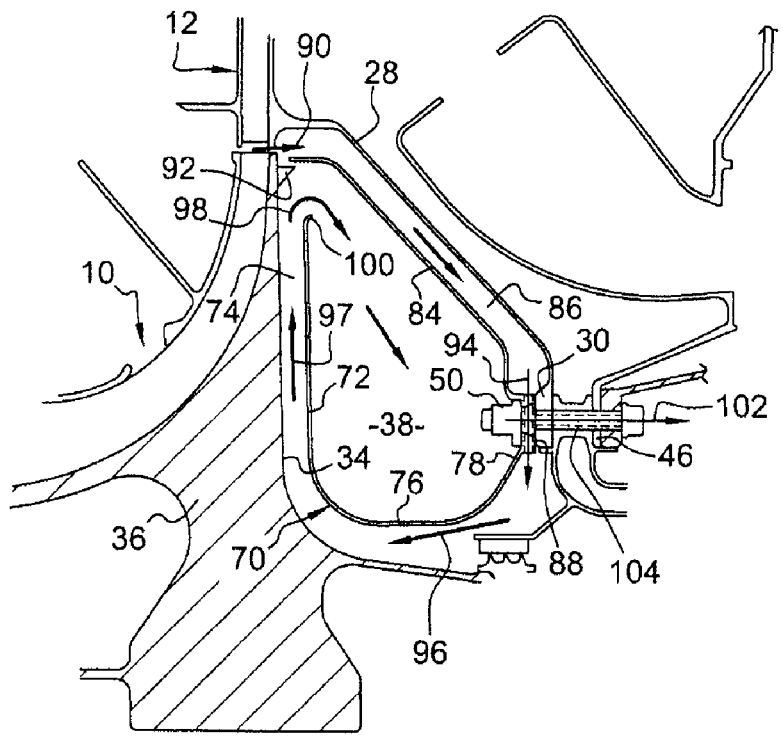
FIG. 2 is a partial schematic view in axial section of a system for ventilating a downstream cavity of a compressor impellor according to the invention.

In the embodiment of FIG. 2, the guidance means include two annular metal sheets 70, 84 fixedly mounted in the downstream cavity 38 of the impellor in order to guide the ventilation air taken from the outlet of the compressor radially from the inside to the outside along the downstream face 34 of the impellor.

A first annular diversion metal sheet 70 is L-shaped or U-shaped in axial section and extends along the downstream face 34 of the impellor in order to form an annular airflow passageway 74 that is substantially bent at a right angle, the radially external end of the passageway 74 opening outward in the vicinity of the outlet 20 of the compressor, and its downstream end extending axially downstream as far as the air injection circuit 32.

The metal sheet 70 comprises a substantially radial upstream portion 72 that extends downstream and along the downstream radial surface of the impellor, and a substantially cylindrical downstream portion 76 that extends downstream from the radially internal end of the upstream portion 72, around and at a distance from the cylindrical surface of the downstream face 34 of the impellor. This downstream portion 76 terminates at its downstream end in an external annular flange 78 attached by the means 50 to the flange 30 of the end-piece of the diffuser and to the circuit 32.

A second diversion annular metal sheet 84 is mounted in the downstream cavity 38 of the impellor, inside the end-piece 28 of the diffuser and outside the first metal sheet 70. This second metal sheet 84 is substantially frustoconical and extends, from its downstream end connected to the flange 78 of the first metal sheet 70, in the upstream and outward direction, as far as the vicinity of the outlet 20 of the compressor. The upstream end of the metal sheet 84 is substantially cylindrical and situated radially at the outlet 20 of the compressor, and the rest of the metal sheet 84 extends substantially parallel to the end-piece 28 of the diffuser in order to form a passageway 86 in which the air taken from the outlet of the compressor flows. The downstream end of this passageway 86, situated at the flanges 30, 78 for attachment of the end-piece and of the first metal sheet 70, respectively, communicates with the downstream end of the passageway 74 by means of substantially radial orifices 88 formed in the flange 78 of the first metal sheet 70 or in the flange 30 of the end-piece 28. These orifices are evenly distributed about the axis of the turbomachine and are formed between the attachment means 50.

The air 90 taken from the outlet of the compressor is prevented from traveling directly inside the metal sheet 84 by means of a slight axial clearance between the downstream face 34 of the impellor and the upstream end of the metal sheet 84, and by means of an annular flow diversion element 92 formed as a protrusion on the downstream face 34 of the impellor and situated radially inside the upstream end of the second metal sheet 84 and at a slight radial distance from the latter. A variant consists in dispensing with this annular element.

The air 90 flows inward from upstream to downstream in the passageway 86 delimited by the end-piece 28 of the diffuser and the second metal sheet 84, then enters the passageway 74 through the orifices 88 of the flange 78 of the first metal sheet 70 (arrows 94). The air 96 flows in the passageway 74 from downstream to upstream along the cylindrical portion 76 of the first metal sheet 70 then radially from the inside to outside along the radial portion 72 of the metal sheet 70. This air which heats up on the downstream face 34 of the impellor is diverted downstream by the element 92 (arrow 98) into the annular chamber formed between the diversion metal sheets 70 and 84. The radially external end 100 of the first metal sheet 70 is curved downstream and inward in order to limit the turbulence when the air 98 passes between the two metal sheets 70, 84. A variant consists in not curving this metal sheet.

The hot air is carried away (arrow 102) downstream through the air passageway axial orifices 104 provided in the flanges 30, 78, 46 and the circuit 32, between the attachment means 50 and the aforementioned radial orifices 88.

Figure 3:
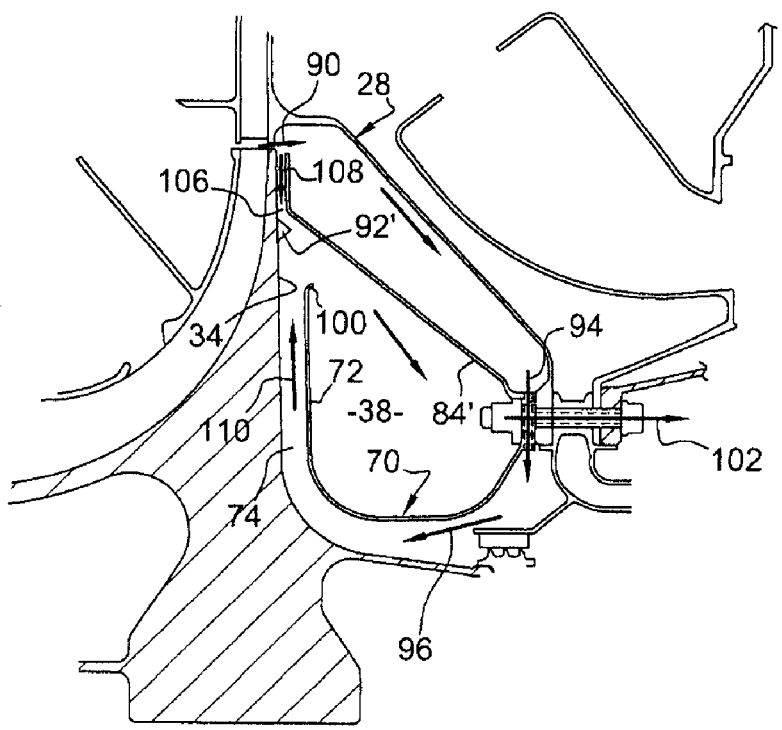
FIGS. 3 to 9 are views corresponding to FIG. 2 and represent variant embodiments of the system according to the invention.

In the variant shown in FIG. 3, the second diversion metal sheet 84' differs from that of FIG. 2 in that its upstream end is substantially radial and extends downstream and along a radially external portion of the downstream face of the impellor 36 in order to form a radial annular space 106 of small axial dimension. The radially external end of the metal sheet 84' is situated radially at the outlet 20 of the compressor so that a portion of the air taken from the outlet of the compressor flows from the outside to the inside in the radial space 106 (arrow 108).

An annular flow diversion element 92' is formed as a protrusion on the downstream face 34 of the impellor between the upstream ends of the two metal sheets 84' and 70. The air 108 that comes out of the radial space 106 is diverted downstream by this element 92' into the annular chamber delimited by the metal sheets 70, 84'. The air 110 that comes out of the passageway 74 formed between the impellor and the first metal sheet 70 is also diverted downstream by the element 92' and mixes in the chamber with the air coming out of the radial space 106.

The ventilation system of FIG. 3 makes it possible to cause relatively cool air to flow along the radially internal and external portions of the impellor and to divert this air downstream when it is heated on the downstream face 34 of the impellor.

Figure 4:
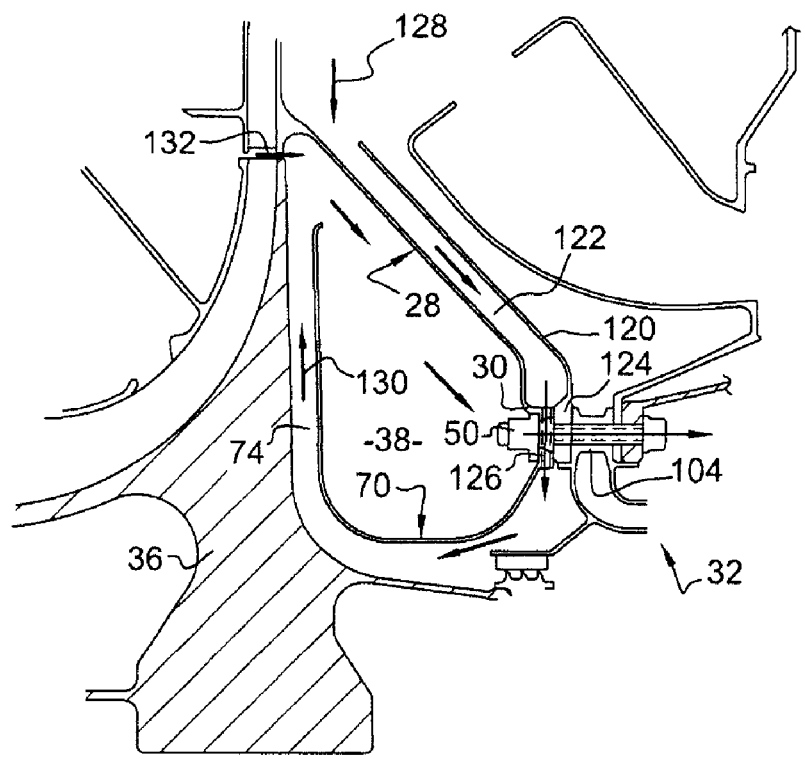

In the variant of FIG. 4, the diversion means comprise a first metal sheet 70, substantially identical to that of FIG. 2, which forms with the impellor an annular passageway 74 in which flows, radially from inside to outside, air originating from the diffuser 12, the air coming out of this passageway 74 then being mixed with air taken from the outlet of the compressor.

The diversion means comprise a second metal sheet 120 of frustoconical shape that is mounted about the end-piece 28 of the diffuser, at a short distance from the latter, in order to form a second air flow passageway 122 that opens at its upstream end into the annular internal stream 54 going round the combustion chamber 14. The second metal sheet 120 terminates at its downstream end in an internal annular flange 124 attached by the aforementioned means 50 to the circuit 32, this flange 124 being clamped axially between the flange 30 of the end-piece of the diffuser and the circuit 32. A variant consists in dispensing with this metal sheet 120. The flange 124 is then either retained or incorporated into the flange 30.

The downstream end of the passageway 122 formed by the second metal sheet 120 communicates with the downstream end of the passageway 74 delimited by the first metal sheet 70 by means of air passage orifices 126 formed in the flange 30 of the end-piece of the diffuser, these orifices 126 being evenly distributed about the axis of the turbomachine, between the attachment means 50. The downstream end of the first metal sheet 70 is attached by welding to the flange 30 of the end-piece. The upstream end of the first metal sheet 70 is situated at a radius smaller than that of the outlet of the compressor. A variant may be to have the upstream end of the metal sheet 70 at a radius at least equal to that of the outlet of the compressor (see for example in FIG. 6 where the upstream end of the metal sheet 70 has a larger radius than that of the outlet of the compressor).

A portion of the air coming out of the diffuser 12 and entering the internal stream 54 is swept (arrow 128) into the second passageway 122 formed by the second metal sheet 120 and the end-piece 28 of the diffuser then enters the first passageway 74 through the orifices 126. The air 130 that rises along the downstream face of the impellor heats up and is mixed at the outlet of the passageway 74 with air taken from the outlet of the compressor (arrow 132). This air mixture enters the annular chamber delimited by the first metal sheet 70 and the end-piece 28 of the diffuser and is then carried away through the orifices 104 of the flanges 30, 124, 46 and the circuit 32.

Figure 5:
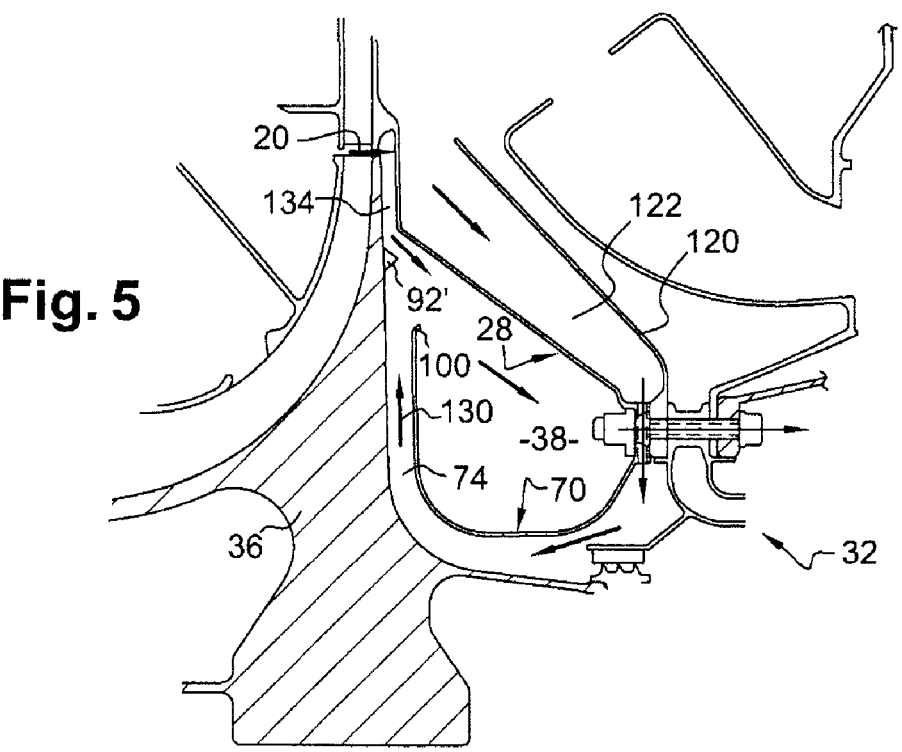

As a variant and as shown in FIG. 5, the end-piece 28 of the diffuser comprises a substantially radial upstream portion that extends downstream from the inlet 22 of the diffuser and along a radially external portion of the impellor in order to form a radial annular space 134 communicating at its radially external end with the outlet 20 of the compressor.

An annular flow diversion element 92' is formed as a protrusion on the downstream face of the impellor between the upstream ends of the end-piece 28 and of the first metal sheet 70. The air that comes out of the radial space 134 is diverted downstream by this element 92' and mixes in the chamber with the air 130 that comes out of the passageway 74 and that is diverted downstream by the element 92'.

The ventilation system of FIG. 5 also makes it possible to cause relatively cool air to flow along the radially internal and external portions of the impellor.

Figure 6:
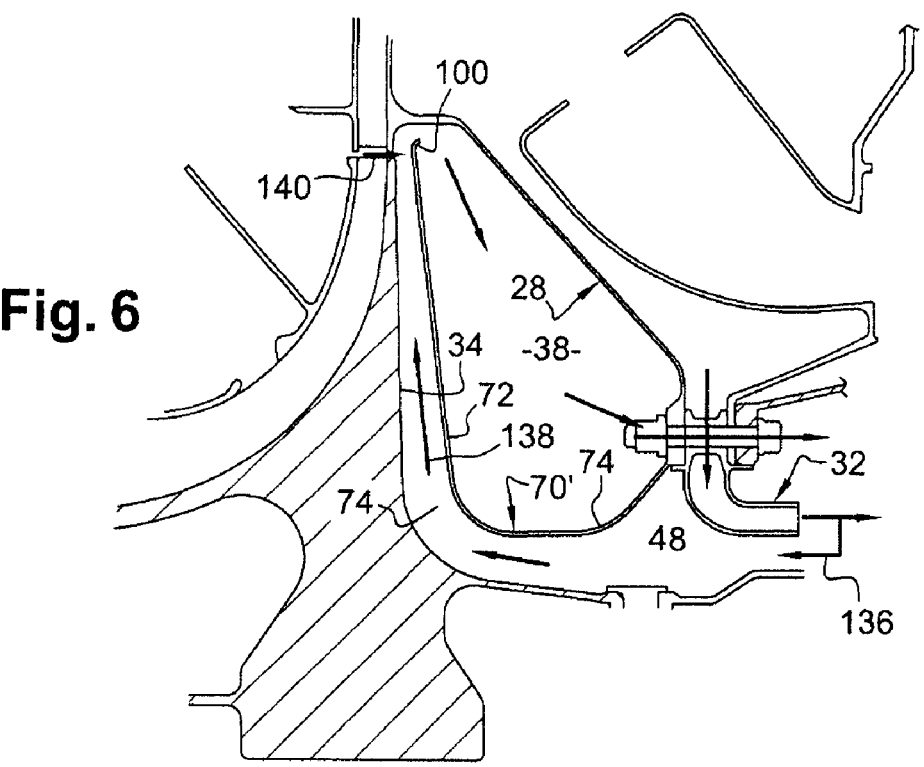

In the variant shown in FIG. 6, the diversion means comprise only one annular metal sheet 70' that forms, with the downstream face of the impellor, an annular passageway 74 supplied by air taken from the outlet of the air injection circuit 32, the air coming out of this radial passageway 74 being intended to mix with air taken from the outlet of the compressor.

A fraction of the airflow coming out of the circuit 32 is taken (arrow 136) by appropriate means and flows from downstream to upstream in the passageway 74 along the cylindrical portion of the metal sheet 70' and radially from inside to outside along the radial portion of the metal sheet 70'. In the example shown, the metal sheet 70' extends approximately along the whole of the downstream face of the impellor and its radially external end 100 is situated radially at the inlet of the diffuser 12. The air 138 that rises in the passageway 74 heats up on the downstream face of the impellor and is then mixed with the air 140 taken from the outlet of the compressor. This mixture of air passes between the radially external end 100 of the metal sheet and the end-piece of the diffuser and is then carried away through the orifices 104 of the flange 30 of the end-piece 28 and the circuit 32. The downstream end of the metal sheet is connected by welding to the flange 30 of the end-piece.

A variant consists in taking air directly from the circuit 32 through the orifices formed in the circuit and emerging at one of their ends in the annular channel 48 of the circuit and at the other of their ends in the downstream end of the annular passageway 74.

Figure 7:
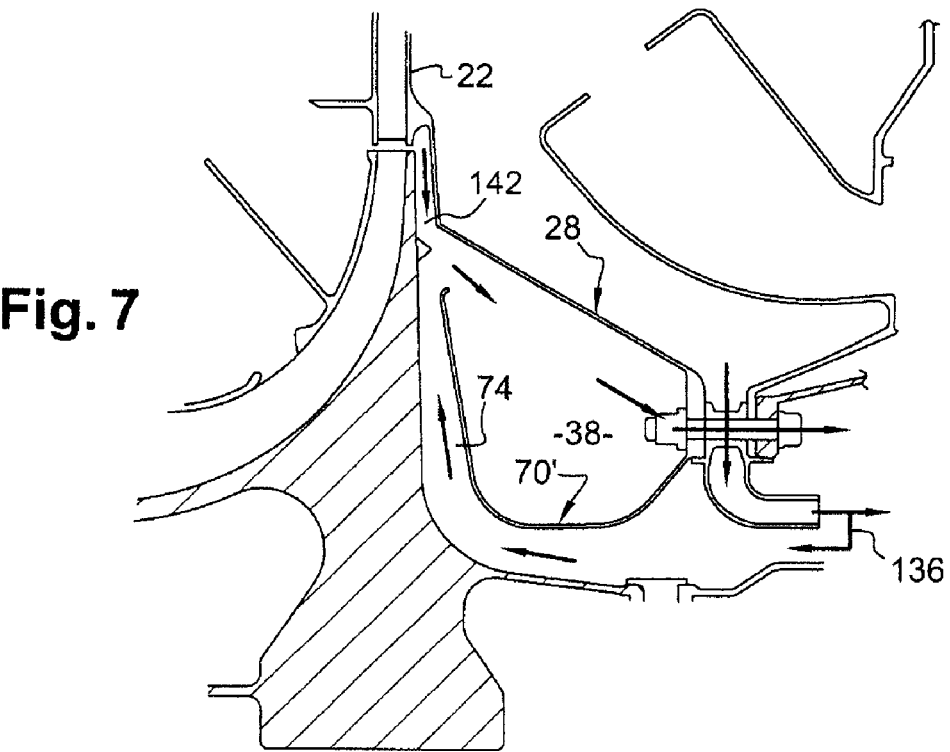

In the variant of FIG. 7, and as described with reference to FIG. 5, the end-piece 28 of the diffuser comprises a radial upstream portion that extends downstream from the inlet 22 of the diffuser and along a radially external portion of the impellor in order to form a radial annular space 142 communicating at its radially external end with the outlet of the compressor. For the operation of this ventilation system, reference is made to the case of FIG. 5.

Figure 8:
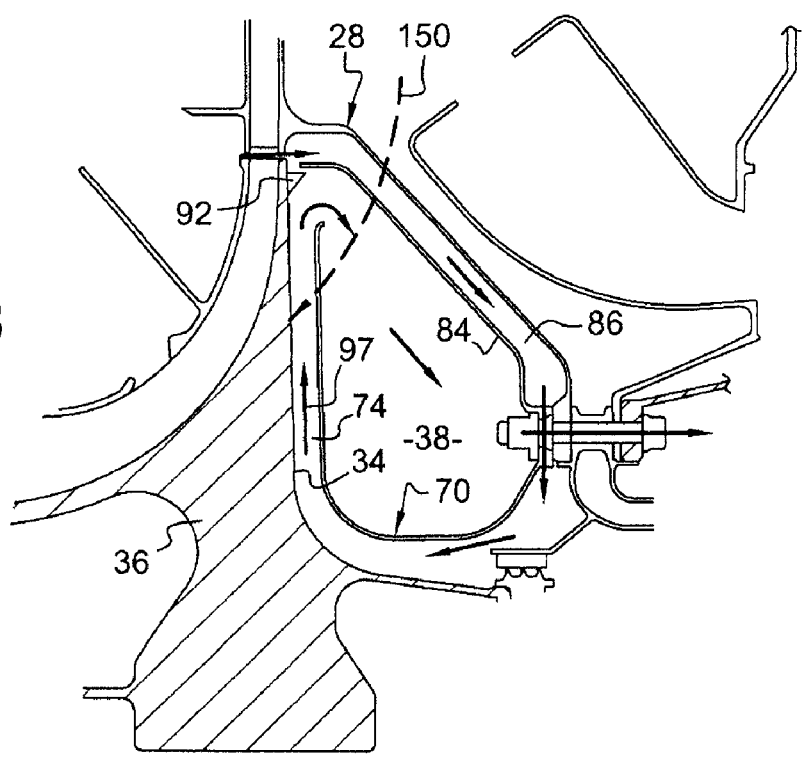
Figure 9:
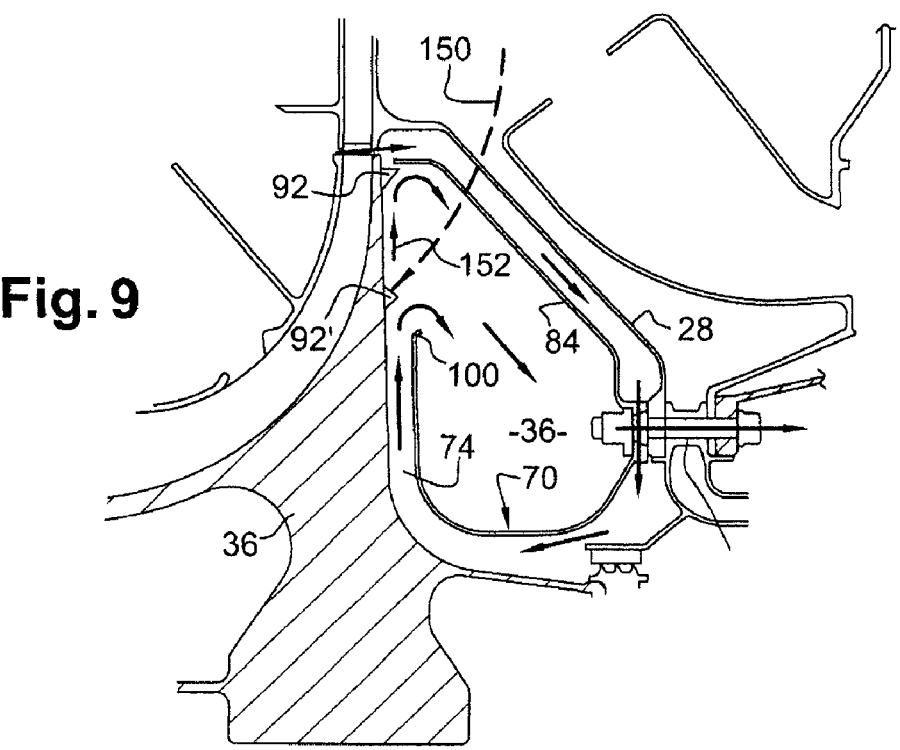

The variants of FIGS. 8 and 9 differ from the embodiments of FIGS. 2 and 3 in that they comprise ventilation air injection means (schematically shown by the dashed lines 150) on the downstream face of the impellor, this air being injected in the direction of rotation of the impellor so as to minimize the total relative temperature of this air seen by the impellor.

In FIG. 8, the outlet of the injection means emerges on the downstream face 34 of the impellor, in the passageway 74 defined by the first metal sheet 70. The injected air mixes with the air 97 flowing radially from inside to outside along the downstream face of the impellor, this air mixture then being diverted downstream by the annular element 92 formed as a protrusion at the radially external end of the impellor.

In FIG. 9, a second annular flow diversion element 92' is formed as a protrusion on the downstream face of the impellor, radially outside the radially external end 100 of the first metal sheet 70 in order to divert downstream the air coming out of the passageway 74. The outlet of the injection means 150 is situated radially outside this element 92' so that the injected air 152 flows from inside to outside along the downstream face of the impellor and is diverted downstream to the radially external end of the impellor by the first element 92. This air 152 then mixes with the air coming out of the passageway 74 in the annular chamber delimited by the annular metal sheets 70, 84.

The injection means 150 are attached by appropriate means to the second annular metal sheet 84 and/or to the annular end-piece 28 of the diffuser.

This system also makes it possible to reduce the temperature of the ventilation air of the downstream cavity of the impellor and prevent air that is too hot from flowing along the downstream face of the impellor.

These injection means 150 could also be combined with the ventilation systems of FIGS. 4 to 7.

The invention claimed is:

1. A system for ventilating a downstream cavity of an impellor of a centrifugal compressor in a turbomachine, this cavity being delimited by a downstream face of the impellor and by an annular downstream end-piece of an annular diffuser arranged at the output of the compressor and being ventilated by taking air from the outlet of the centrifugal compressor, which comprises diversion means mounted fixedly in the downstream cavity of the impellor in order, on the one hand, to divert, along the annular end-piece of the diffuser, the air taken from the outlet of the compressor to its inlet in the downstream cavity of the impellor, and in order, on the other hand, to divert the ventilation air from the downstream portion of the downstream cavity and cause it to flow radially from the inside to the outside along the downstream face of the impellor.

2. The system as claimed in claim 1, wherein the diversion means comprise an annular metal sheet mounted fixedly in the downstream cavity of the impellor on means of attaching the downstream end of the annular end-piece of the diffuser, this metal sheet extending upstream from these attachment means along the downstream face of the impellor and terminating in the vicinity of the means for taking air from the outlet of the compressor.

3. The system as claimed in claim 2, wherein the diversion means include a second annular metal sheet mounted fixedly on means for attaching the downstream end of the annular end-piece of the diffuser, this second metal sheet extending upstream from these attachment means substantially parallel to the annular end-piece of the diffuser and terminating in the vicinity of the means for taking air from the outlet of the compressor.

4. The system as claimed in claim 3, wherein the upstream end of the second annular metal sheet is situated radially outside the upstream end of the first annular metal sheet.

5. The system as claimed in claim 4, wherein the downstream face of the impellor supports an annular flow diversion element that extends as a protrusion into the downstream cavity between the upstream ends of the two annular metal sheets.

6. The system as claimed in claim 3, wherein the first annular metal sheet forms, with the downstream face of the impellor, an annular ventilation air passageway that communicates at its downstream end with an annular ventilation air passageway formed between the second annular metal sheet and the end-piece of the diffuser.

7. The system as claimed in claim 6, wherein the second annular metal sheet is inside the downstream cavity and the annular passageway that it forms with the annular end-piece of the diffuser is supplied with air taken from the outlet of the compressor.

8. The system as claimed in claim 6, wherein the second annular metal sheet is outside the downstream cavity and annular passageway that it forms with the annular end-piece of the diffuser is supplied with air coming out of the diffuser.

9. The system as claimed in claim 3, which comprises means for injecting ventilation air onto the downstream face of the impellor, the flow of air coming out of these injection means being oriented in the direction of rotation of the impellor, the injection means being supported by the second annular metal sheet and/or by the annular end-piece of the diffuser.

10. The system as claimed in claim 2, wherein the annular metal sheet defines, with the downstream face of the impellor, an annular passageway supplied at its downstream end with air taken from a ventilation air injection circuit.

11. A turbomachine which comprises a ventilation system as claimed in claim 1.

* * * * *

UNITED STATES PATENT AND TRADEMARK OFFICE
CERTIFICATE OF CORRECTION

| | | |
|---|---|---|
| PATENT NO. | : 7,942,630 B2 | Page 1 of 1 |
| APPLICATION NO. | : 11/779016 | |
| DATED | : May 17, 2011 | |
| INVENTOR(S) | : Thierry Argaud et al. | |

It is certified that error appears in the above-identified patent and that said Letters Patent is hereby corrected as shown below:

In column 3, line 20, change "900" to --90°--.

Signed and Sealed this
Twelfth Day of July, 2011

David J. Kappos
*Director of the United States Patent and Trademark Office*